(12) United States Patent
Kori et al.

(10) Patent No.: US 6,836,844 B1
(45) Date of Patent: Dec. 28, 2004

(54) INFORMATION SIGNAL COPY MANAGING METHOD, INFORMATION SIGNAL RECORDING METHOD, INFORMATION SIGNAL OUTPUT APPARATUS, AND RECORDING MEDIUM

(75) Inventors: Teruhiko Kori, Kanagawa (JP); Masaya Otsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 854 days.

(21) Appl. No.: 09/580,141

(22) Filed: May 30, 2000

(30) Foreign Application Priority Data

Jun. 1, 1999 (JP) ............................................ 11-154005

(51) Int. Cl.⁷ ............................. H04L 9/00; H04N 7/167
(52) U.S. Cl. ........................ 713/176; 380/222; 380/237
(58) Field of Search ........................ 713/176; 380/222, 380/237

(56) References Cited

U.S. PATENT DOCUMENTS 6,044,182 A * 3/2000 Daly et al. .................. 382/284
6,064,737 A * 5/2000 Rhoads ....................... 713/176
6,513,118 B1 * 1/2003 Iwamura ..................... 713/176
6,611,607 B1 * 8/2003 Davis et al. ................ 382/100

* cited by examiner

*Primary Examiner*—Gilberto Barrón
*Assistant Examiner*—Kambiz Zand
(74) *Attorney, Agent, or Firm*—Frommer Lawrence & Haug LLP; William S. Frommer; Dennis M. Smid

(57) ABSTRACT

An information signal copy managing method for properly protecting the copyright of information signals and, at the same time, guaranteeing user advantages in copying information signals within a limited range. Information indicative of the start and end of each piece of information content covered by copyright is superimposed thereon as electronic watermark information. The resultant information signal is transmitted. When the received information signal is copied, both the information indicative of the start of the information content and the information indicative of the end thereof are detected from the electronic watermark information, determining the completion of copying. Thus, copying of information content is managed.

5 Claims, 11 Drawing Sheets

EXAMPLE OF DATA EMBEDDING METHOD BASED ON WATERMARK

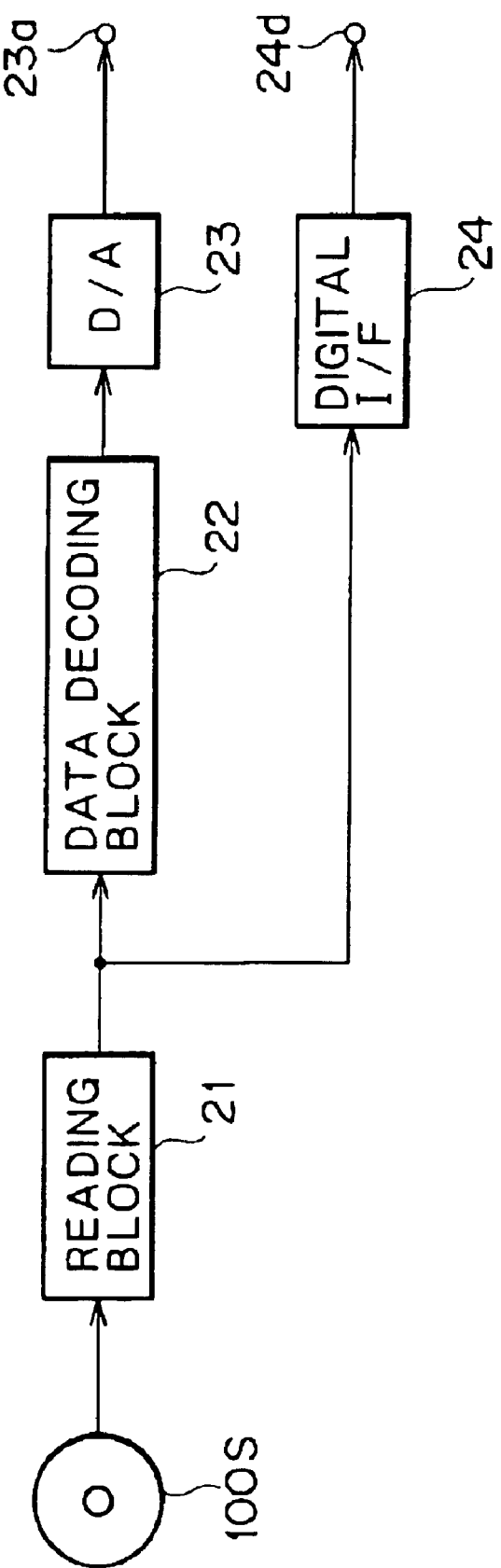
F I G. 5

FIG. 7

| CONTENT ID | COPY PERMITTED COUNT |
|---|---|
| CONTENT 1 | 3 |
| CONTENT 2 | 1 |
| CONTENT 3 | 2 |
| ⋮ | ⋮ |

TB

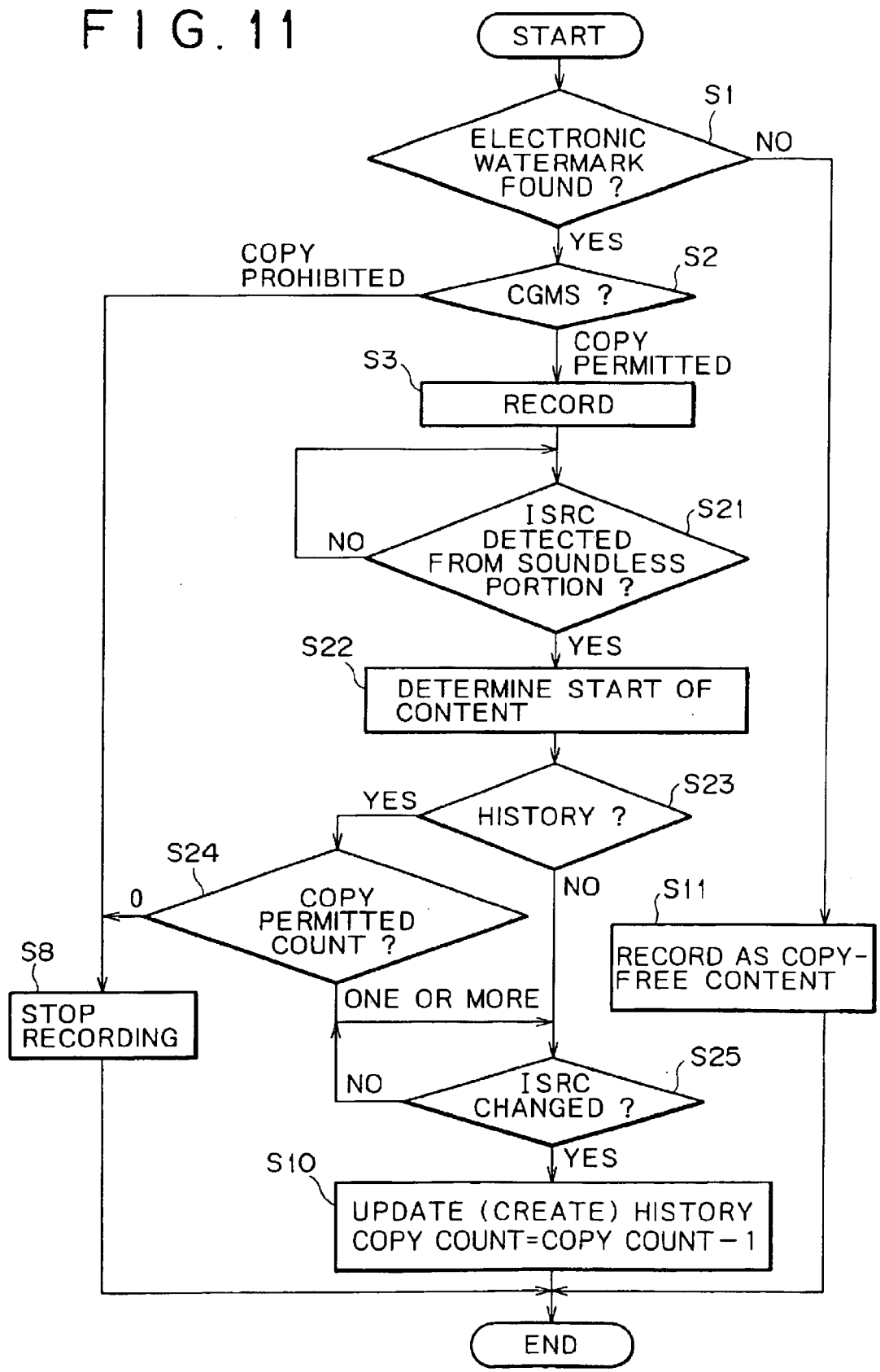

INFORMATION SIGNAL COPY MANAGING METHOD, INFORMATION SIGNAL RECORDING METHOD, INFORMATION SIGNAL OUTPUT APPARATUS, AND RECORDING MEDIUM

BACKGROUND OF THE INVENTION

The present invention relates generally to a information signal copy managing method for managing copying of various information contents such as an audio signal and a video signal for example, an information signal output apparatus and an information signal recording apparatus that operate on the basis of this method, and a recording medium for recording information signals.

Recent widespread proliferation of digital content provided by the Internet, a compact disc (CD), and a digital video disc (DVD) for example poses a new problem of the copyright infringement by the unauthorized copy (duplication) of digital content. To prevent the unauthorized copy, a method has been proposed in which additional information for copy control is attached to digital content.

The prevention of copying is controlled in two manners according to information sources; no copy is allowed at all and copy is allowed only once and therefore a copy cannot be further duplicated (copy control with limited copy generation). The former is applied the original software which is created and sold by content makers as with DVD-ROMs for example. The latter is applied to the information which is broadcast in broadcast media for example.

The copy control with limited copy generation requires schemes for effectively controlling copy generation. The schemes include SCMS (Serial Copy Management System) and CGMS (Copy Generation Management System) for example.

In SCMS, digital copy is permitted only once by use of a copy enable/disable flag and a category code indicative of a digital audio system type such as CD (Compact Disc) or DAT (Digital Audio Tape) for example, these flag and category code being transmitted with a digital audio signal.

Namely, SCMS information consisting of the copy enable/disable flag and the category code to be transmitted with a digital audio signal allows copy of the digital audio signal of the first generation but does now allow copying of the duplicated digital audio signal.

In CGMS, in the case of an analog image signal for example, 2-bit additional information for copy control is superimposed on a particular horizontal interval in the signal's vertical blanking period and, in the case of a digital image signal, this additional information is added to digital image data for transmission.

The 2-bit additional information (hereafter referred to as CGMS information) conveys the following means:
 "00" . . . copy permitted;
 "10" . . . copy permitted only once (only for one generation); and
 "11" . . . copy prohibited.

If the CGMS information attached to image information is "10", a CGMS-compliant recording apparatus determines that the image information can be duplicated and executes a recording (or duplicating) operation. As a result, CGMS information "11" is added to the recorded image information. When the CGMS information thus attached to image information to be recorded is "11", the CGMS-compliant apparatus determines that this image signal cannot be copied, disabling further recording processing.

Thus, SCMS and CGMS control the copy generation of audio signals and video signals (or image information).

Use of above-mentioned SCMS or CGMS can prevent a copied information signal from being copied onto another recording medium. However, there is still a problem that a first-generation information signal provided by a content maker in the form of a CD for example can be infinitely duplicated from that CD by use of the same recording apparatus.

Consequently, instead of the above-mentioned copy generation control schemes which pose a danger of unauthorized mass copy, a scheme may be proposed in which information signals are provided in the form of copy-prohibited discs for example, thereby disabling copying of information signals from the beginning.

This scheme can securely protect the copyright of information signals. However, this scheme allows users to use information signals only from the copy-inhibited disc, thereby significantly limiting user advantages in the use of information signals.

For example, the copy-prohibited disc limits the usage of information signals in which the user selects desired titles of music from the disc and duplicates the selected titles onto a small-sized magneto-optical disc called an MD (Mini Disc) or a cassette tape for reproduction on a car stereo device or a portable player for personal enjoyment.

To overcome this problem, a method has been proposed in which the copyright of information signals can be properly protected and, at the same time, user convenience for using information signals by duplicating them within a limited range can be ensured. To be specific, this method limits the number of times copy can be made in which each recording apparatus controls the number times copy is made for each piece of information content ("information content" herein denotes each music or movie title for example), one title being copied only by the predetermined number of times.

However, if this proposed method decrements the number of times copy can be made when the stop key of a recording apparatus is inadvertently pressed during recording of a title for example, it counts up for an incomplete copy, putting the user at a great disadvantage.

SUMMARY OF THE INVENTION

It is therefore an object of the present invention to provide an information signal copy managing apparatus, an information signal recording apparatus, an information signal output apparatus, and a recording medium that overcome the above-mentioned problems by allowing the user to fully understand the completion of copy and recording of each piece of information content.

In carrying out the invention and according to one aspect thereof, there is provided an information signal copy managing method comprising the steps of: superimposing information indicative of a start of and information indicative of an end of a portion of each piece of information content, the portion being covered by copyright, onto each piece of information content as electronic watermark information to transmit a resultant information signal; and, when copying and recording the information signal, determining completion of copying of each piece of information content when both of the information indicative of the start of and the information indicative of the end of that portion are detected from the electronic watermark information, thereby executing copy management.

Detection of the information indicative of the start of and the information indicative of the end of the copyrighted portion as electronic watermark information is determined as the completion of copying of the information content. Consequently, a copy operation that failed due to an erroneous user operation for example is not recognized as complete, thereby guaranteeing user advantages in copying information signals within a limited range.

In addition, start position information and end position information are superimposed on the information content as electronic watermark information. This makes it difficult to tamper the start and end position information, thereby properly protecting the copyright of the provided information content.

BRIEF DESCRIPTION OF THE DRAWINGS

These and other objects of the invention will be seen by reference to the description, taken in connection with the accompanying drawing, in which:

FIG. 5 is a block diagram illustrating one example of an information signal reproducing apparatus;

FIG. 7 is a diagram illustrating contents of a copy history management memory provided in the embodiment of the information signal recording apparatus of the invention;

FIG. 11 is a flowchart for describing another example of copy control processing in the embodiment of the information signal recording apparatus.

DETAILED DESCRIPTION OF THE PREFERRED EMBODIMENTS

This invention will be described in further detail by way of preferred embodiments of an information signal copy managing method, an information signal output apparatus, an information signal recording apparatus, and a recording medium with reference to the accompanying drawings.

In the following embodiments, an example is used for description in which audio signals representing music for example are provided in the form of a compact disc (hereafter referred to as a CD) as content information, the audio signals recorded on this CD are reproduced by a CD player to be copied by a recording apparatus onto a mini disc (hereafter referred to as an MD).

Figure 1:
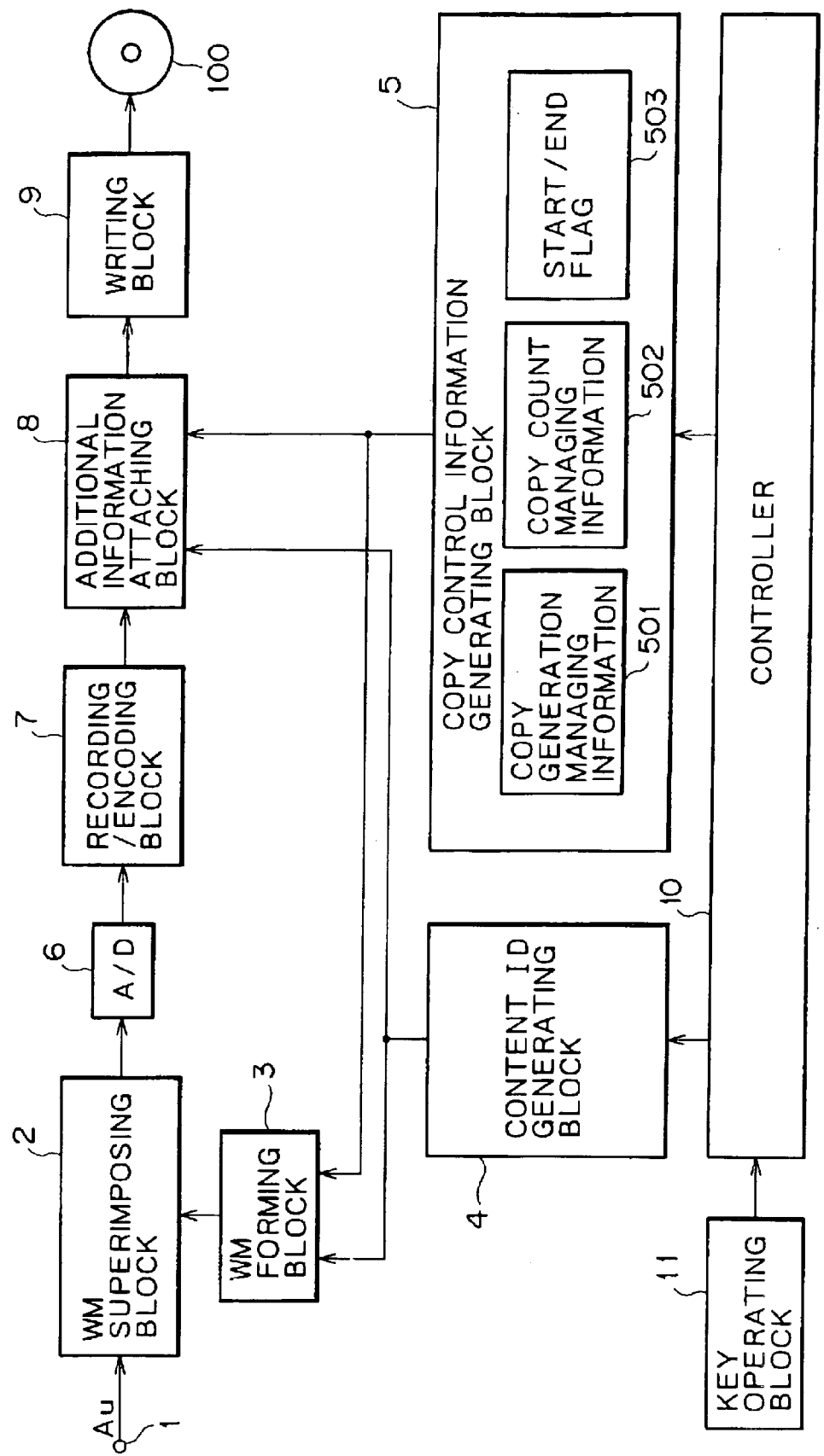
FIG. 1 is a block diagram illustrating a configuration of an information signal recording apparatus practiced as one preferred embodiment of the invention.

About an authoring apparatus:

FIG. 1 illustrates a configuration of an audio signal recording apparatus for making a master CD on which music (an audio signal) is recorded as an example of information content. This recording apparatus is used on the content maker side and is generally called an authoring apparatus.

As shown in FIG. 1, the authoring apparatus of this embodiment comprises an input terminal 1, an electronic watermark information superimposing block (hereafter referred to as an WM superimposing block) 2, an electronic watermark information forming block (hereafter referred to as a WM forming block) 3, a content ID generating block 4, a copy control information generating block 5, an A/D converter 6, a recording encoding block 7, an additional information attaching block 8, a writing block 9, a controller 10, and a key operating block 11. A CD 100 is a CD on which music is recorded by this authoring apparatus of this embodiment.

In the authoring apparatus of this embodiment, music as information content is recorded on the CD 100 with content ID and copy control information attached as additional electronic watermark information. Therefore, these pieces of additional information are generated by the content ID generating block 4 and the copy control information generating block 5 shown in FIG. 1.

The content ID generating block 4 generates a content ID as identification information for identifying each piece of information content to be recorded on the CD 100. In the present embodiment, ISRC (International Standard Recording Code) is used for the content ID.

Figure 2:
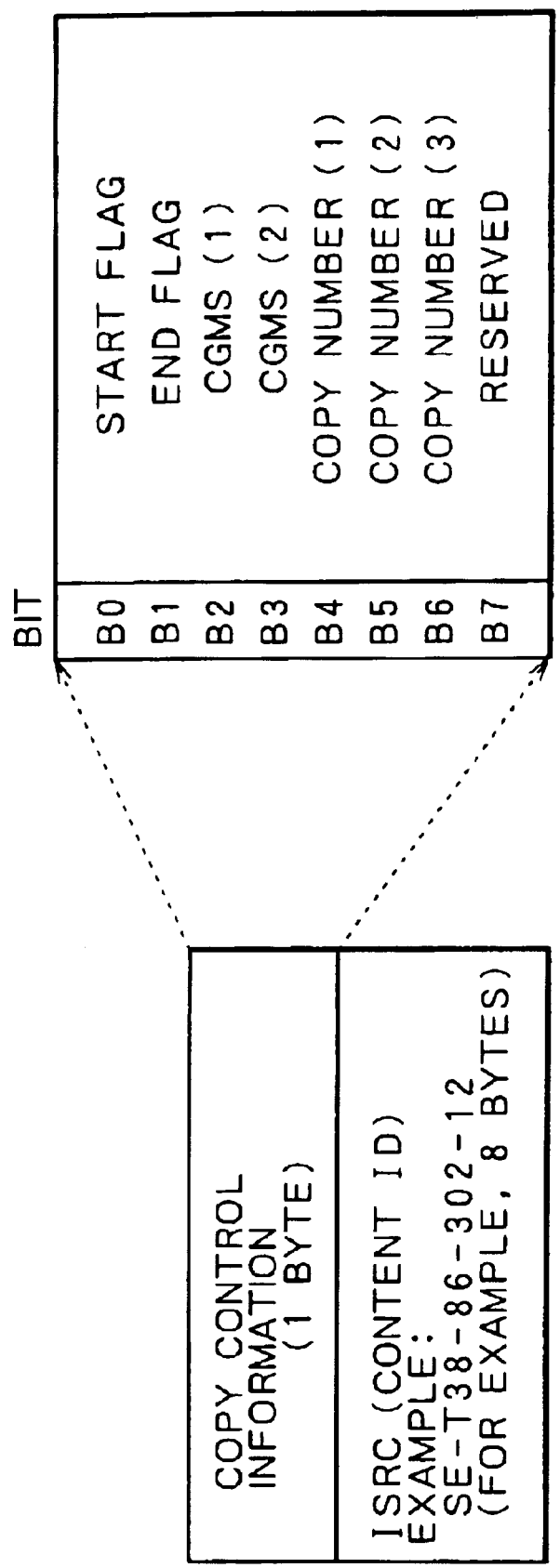
FIG. 2 is a diagram illustrating one example of electronic watermark information for use in an information signal copy managing method according to the invention.

This ISRC consists of 12 characters such as "SE-T38-86-302-12" for example as shown in FIG. 2. To reduce the data quantity, the ISRC may be coded for data compression. The ISRC in this example is 8-byte information for example after data compression.

The copy control information generating block 5 comprises a copy generation managing information generating block 501, a copy count managing information generating block 502, and a start/end flag generating block 503.

In the present embodiment, 2-bit CGMS information is used for the copy generation managing information generated by the copy generation managing information generating block 501. For the copy count managing information, the information about the copy permitted count for each piece of information content determined by copyright holder is used. This copy permitted count information is 3 bits wide in this example, specifying the number of times copy is permitted; zero time (copy prohibited), once, twice, . . . , infinite (copy free).

The start/end flag generating block 503 generates a start flag and an end flag indicative of the start and end of a portion covered by copyright. These start flag and end flag are each 1-bit information.

In the present embodiment, these start flag and end flag are adapted to set up (for example, become "1") at the start and end of each piece of information content.

Because these start and end flags are for detection of the completion of copy, they may be adapted so that they indicate the start and end of a portion that includes most information content. Namely, the start and end flags need not be set up by exactly matching the start and end of each piece of information content.

Meanwhile, a copyright holder may want to regard the copy of the first chorus, which is most popular, of a piece of music as the complete copy of it. In consideration thereof, if a piece of music consists of 3 choruses, the end flag may be set up for each of these choruses. In this case, if plural pieces of information content identified by the same ISRC end in 1 chorus, the copy may be regarded as complete. When 3 choruses have all been copied, plural end flags are detected. Superimposition of the same ISRC on the information content from its start to its end and combination thereof beforehand provides 1 copy.

Namely, the positions at which the start and end flags are set up may be any positions that can be compromised between copyright holder and user as the start and end of plural portions completion and detection of information content.

In the present embodiment, copy control information is made up of 8-bit (1-byte) information B0 through B7 as shown in FIG. 2. Thus, assignment of start flag, end flag, CGMS information, and copy permitted count as copy control information as 1 word allows detection of these pieces of information at a time.

Referring to FIG. 2, CGMS (1) and CGMS (2) indicate first bit 1 and second bit respectively of CGMS information. Copy number (1), copy number (2), and copy number (3) indicate first bit, second bit, and third bit respectively of copy permitted count. "Reserved" denotes a reserve bit.

Before starting recording music on the CD 100, the operator of the authoring apparatus of the present embodiment inputs the content ID, CGMS information, copy permitted count, and start/end flag insertion interval (an interval in which the start and end flags are set to "1") into the authoring apparatus through the key operating block 11. On the basis of the inputs made by the operator, the controller 10 generates and supplies a control signal directing what kind of information to be generated to the content ID generating block 4 and the copy control information generating block 5. Normally, the start flag/end flag insertion interval is an interval from the start of information content to a predetermined time and an interval from the end of information content to a predetermined time.

On the basis of the control signal supplied from the copy control information generating block 5, the content ID generating block 4 and the copy control information generating block 5 form the content ID and the copy control information respectively according to the inputs specified by the user of the authoring apparatus and supply these pieces of information to the WM forming block 3 and the additional information attaching block 8.

The WM forming block 6 execute electronic watermark processing on both the supplied content ID and copy control information, forming the electronic watermark information for them. As described, electronic watermark processing is executed to embed information as noise into the portions of image data or music data which are not essential for human perception, namely the portions which are not redundant to music or image.

Figure 3:
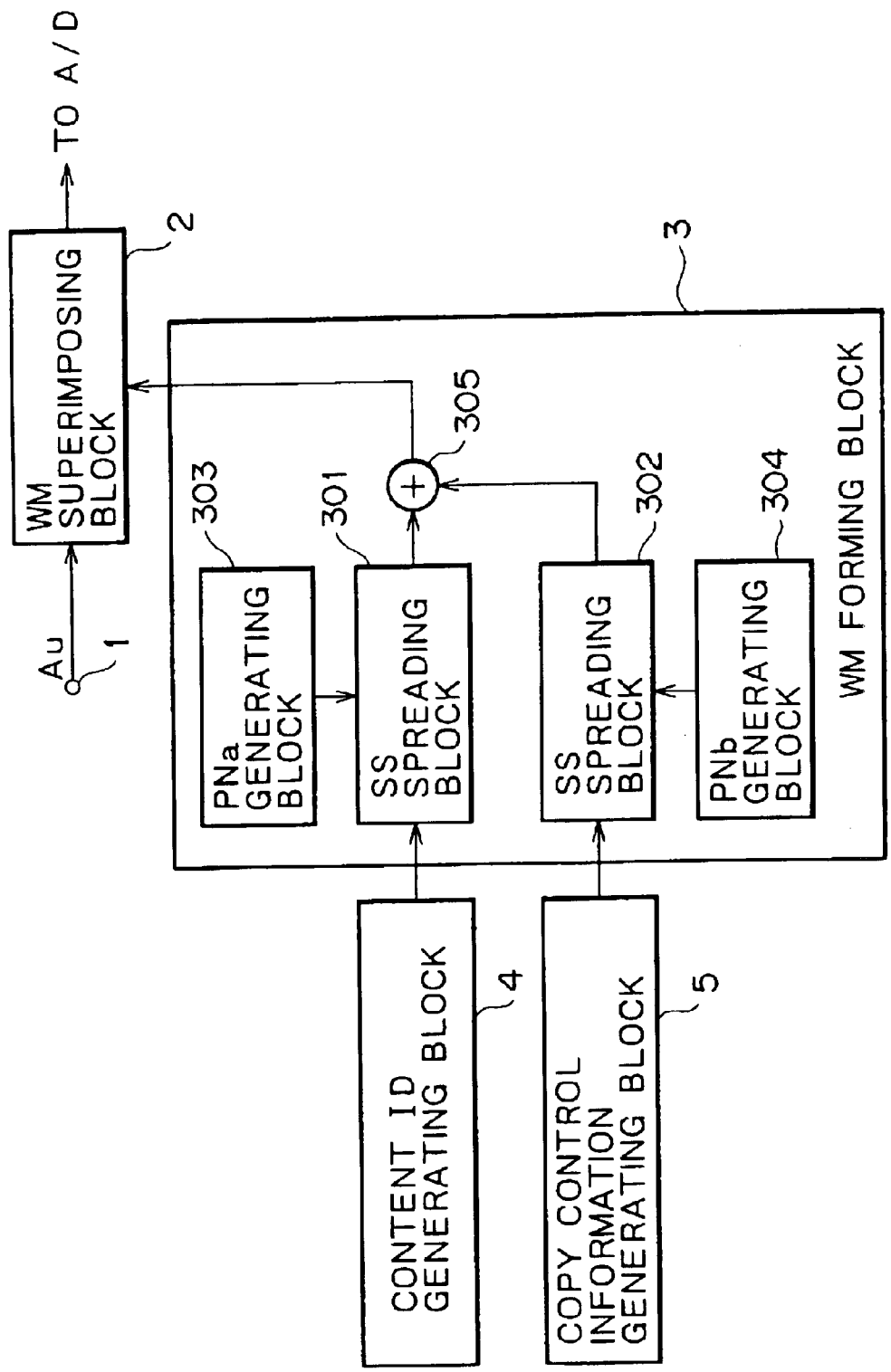
FIG. 3 is a block diagram illustrating an electronic watermark superimposing method for use in the above-mentioned embodiment.

Referring to FIG. 3, there is shown one example of the WM forming block 6 of the present embodiment. In this example, spectrum spread processing is used for electronic watermark processing. Specifically, the content ID and the copy control information are spectrum-spread by PN (Pseudorandom Noise) codes of different systems to form the electronic watermark information.

Namely, in the WM forming block 6 shown in FIG. 3, the ISRC supplied from the content ID generating block 4 is supplied to the spreading block 301 to be multiplied by a PN code PNa of one series supplied from a PNa generating block 303, providing a spread spectrum signal. This spread spectrum signal is then supplied to a mixing block 305.

On the other hand, the copy control information supplied from the copy control information generating block 5 is supplied to a spreading block 302 to be multiplied by a PN code PNb of a different series, providing a spread spectrum signal. This spread spectrum signal is then supplied to the mixing block 305.

The spread spectrum signals of two systems are mixed in the mixing block 305 to be supplied to the WM superimposing block 2.

A signal Au (an analog audio signal) of a piece of music to be recorded on the CD 100 is supplied to the WM superimposing block 2 through the input terminal 1. As described, the WM superimposing block 2 superimposes the electronic watermark information consisting of the spread spectrum signal of the content ID formed by the WM forming block 6 and the spread spectrum signal of the copy control signal onto the analog audio signal Au supplied through the input terminal 1. In this case, the superimposition is performed at a level which is low enough for the watermark to be inconspicuous as noise for the audio signal Au. Alternatively, the superimposition is performed at a relatively high level in portions where noise is inconspicuous and at a relatively low level in other portions by use of human auditory characteristics.

Figure 4:
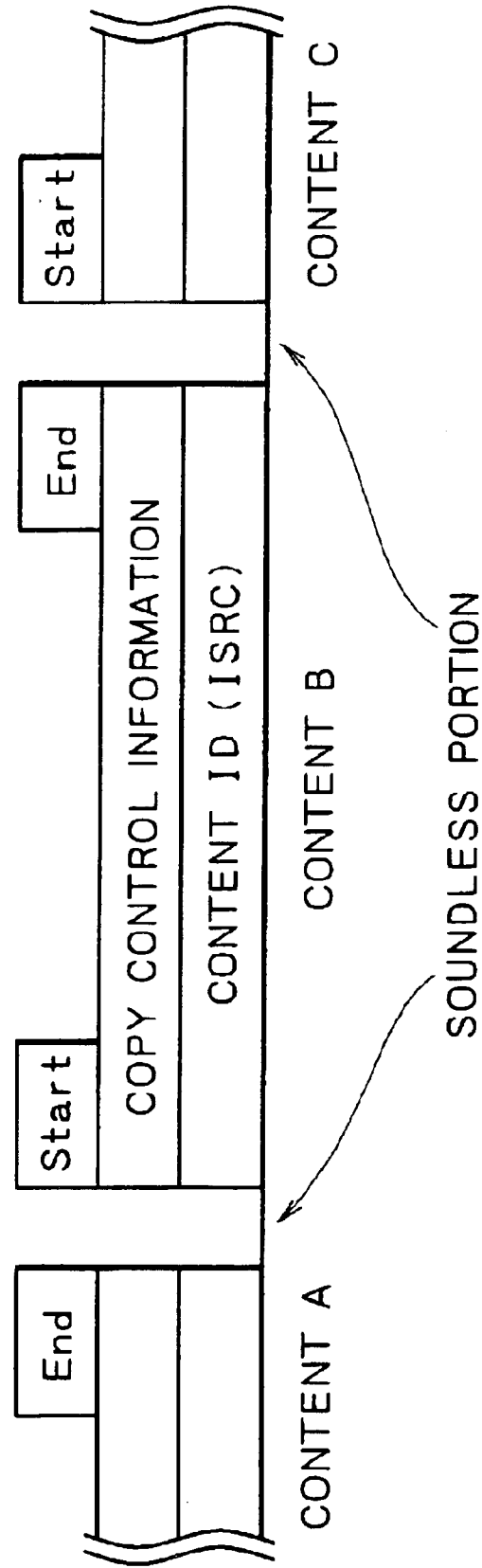
FIG. 4 is a diagram illustrating a state in which electronic watermark is superimposed on information content in the above-mentioned embodiment.

In this example, the electronic watermark information of content ID and the electronic watermark information of copy control information are superimposed on the entire interval from the start to the end of each piece of information content as shown in FIG. 4.

It should be noted that the bit of the start flag of the copy control information is "1" at the beginning of the information content indicated as "START" shown in FIG. 4. At the end of the information content indicated as "END" shown in FIG. 4, the bit of the end flag of the copy control information is "1". In the portion of the information content between "START" and "END", the bits of the start and end flags of the copy control information are both "0"s.

It should also be noted that the electronic watermark information of content ID and the electronic watermark information are superimposed on the entire interval between the start and end of each piece of information content, resulting in a state in which each electronic watermark information is superimposed repeatedly multiple times.

The audio signal superimposed with the content ID and the copy control information as electronic watermark information in the WM superimposing block 2 is supplied to the A/D converter 6 to be converted into a digital signal, which is supplied to the recording encoding block 7.

The recording encoding block 7 compresses the supplied digital audio signal by a predetermined scheme and executes error correction encoding on the digital audio signal. The resultant signal is outputted to the additional information attaching block 8. The additional information attaching block 8 attaches the above-mentioned content ID supplied from the content ID generating block 4 and the copy control information supplied from the copy control information generating block 5 to the compressed digital audio data.

This additional information attaching block 8 attaches the information for controlling copying of the compressed digital audio data. In the present embodiment, the copy control information includes the start and end flags, so that the completion of copy of the digital compressed data may also be properly understood by use of these start and end flags.

In this example, the compressed digital audio data are made up of blocks having a predetermined size. The content ID and the copy control information are attached to each block of data. However, because the content ID has a comparatively large data size, it may be attached over two or more blocks.

Then, the digital audio signal supplied from the additional information attaching block 8 is recorded on the CD 100 through the writing block 9.

Thus, the CD 100 is created in which the copy control information composed of start and end flags, CGMS information, and copy permitted count, and the content ID are superimposed as electronic watermark information respectively and the information content attached as digital additional information is recorded. In the present embodiment, many CDs recorded with the same information are copied from this CD 100 (namely, the master CD) for distribution to many end users.

Reproducing Apparatus:

Referring to FIG. 5, there is shown a diagram illustrating a reproducing apparatus for reproducing the audio signal according to the invention. In the present embodiment, the audio signal reproducing apparatus shown in FIG. 5 is a CD player. The CD player of the present embodiment can reproduce a CD 100S created on the basis of the CD 100 created by the authoring apparatus shown in FIG. 1.

As shown in FIG. 5, the CD player of the present embodiment comprises a reading block 21, a data decoding block 22, a D/A converter 23, an analog audio signal output terminal 23a, a digital interface 24, and a digital audio signal output terminal 24d.

The reading block 21 reads the digital audio signal of the information content recorded on the CD 100S. The read digital audio signal is supplied to the data decoding block 22 and the digital interface 24.

The data decoding block 22 decodes the information content of music, which is the digital audio signal compressed by the predetermined scheme, and supplies the decompressed digital signal to the D/A converter 23. The D/A converter 23 converts the digital audio signal into an analog audio signal and outputs the analog audio signal, which is the information content of music, through the output terminal 23a.

In the example, the content ID and the copy control information attached to the digital audio signal in the additional information attaching block 8 of the above-mentioned authoring apparatus are lost in the course of decoding the digital audio signal and converting it into the analog audio signal.

However, the content ID and the copy control information of the electronic watermark information superimposed on the same time domain as that of the analog audio signal are not lost but outputted along with the analog audio signal to a speaker, an earphone, a headphone, or an audio signal recording apparatus, not shown.

On the other hand, the compressed digital audio signal with the content ID and the copy control information attached is supplied to the digital interface 24. This compressed digital audio signal is outputted through the output terminal 24d. For the digital interface in this example, the IEEE 1394 serial bus interface using CGMS information and having encrypted copyright protection is used for example.

To be more specific, the output of the digital audio information is transmitted, in the compressed state, by the IEEE 1394 interface between the units compliant thereto. The transmission digital information is encrypted in the IEEE 1394 interface to prevent unauthorized copy. This interface also determines whether the transmission digital signal is sent to a unit compliant with the IEEE 1394 bus interface (hereafter, this unit is referred to as a compliant unit) or the recording apparatus. At the same time, this interface verifies the CGMS information, which is the information for copy control. According to the result of this verification, this interface determines whether to send a key for decrypting the encrypted copyright protection to the destination unit.

Namely, the compressed digital audio signal is encrypted by an encryption key which is different for every transmission and the encrypted signal is outputted.

In doing so, communication is made with the destination unit through the digital interface 24 to determine whether the destination unit is a compliant unit. If the destination unit is found a compliant unit, it is determined whether this destination unit is a recording apparatus or not.

Then, according to the decision of the CGMS information attached to the digital audio signal and the decision for the destination unit made through the digital interface 24, it is determined whether to send cipher key information for decrypting the encryption.

For example, if the destination unit is a noncompliant unit, the cipher key information is not passed to the destination unit. Even if the destination unit is a compliant unit, the cipher key information is not passed thereto if it is a recording apparatus and the CGMS information is "11".

The above-mentioned communication control scheme effectively prevents the unauthorized copy of audio digital data.

Recording Unit

Figure 6:
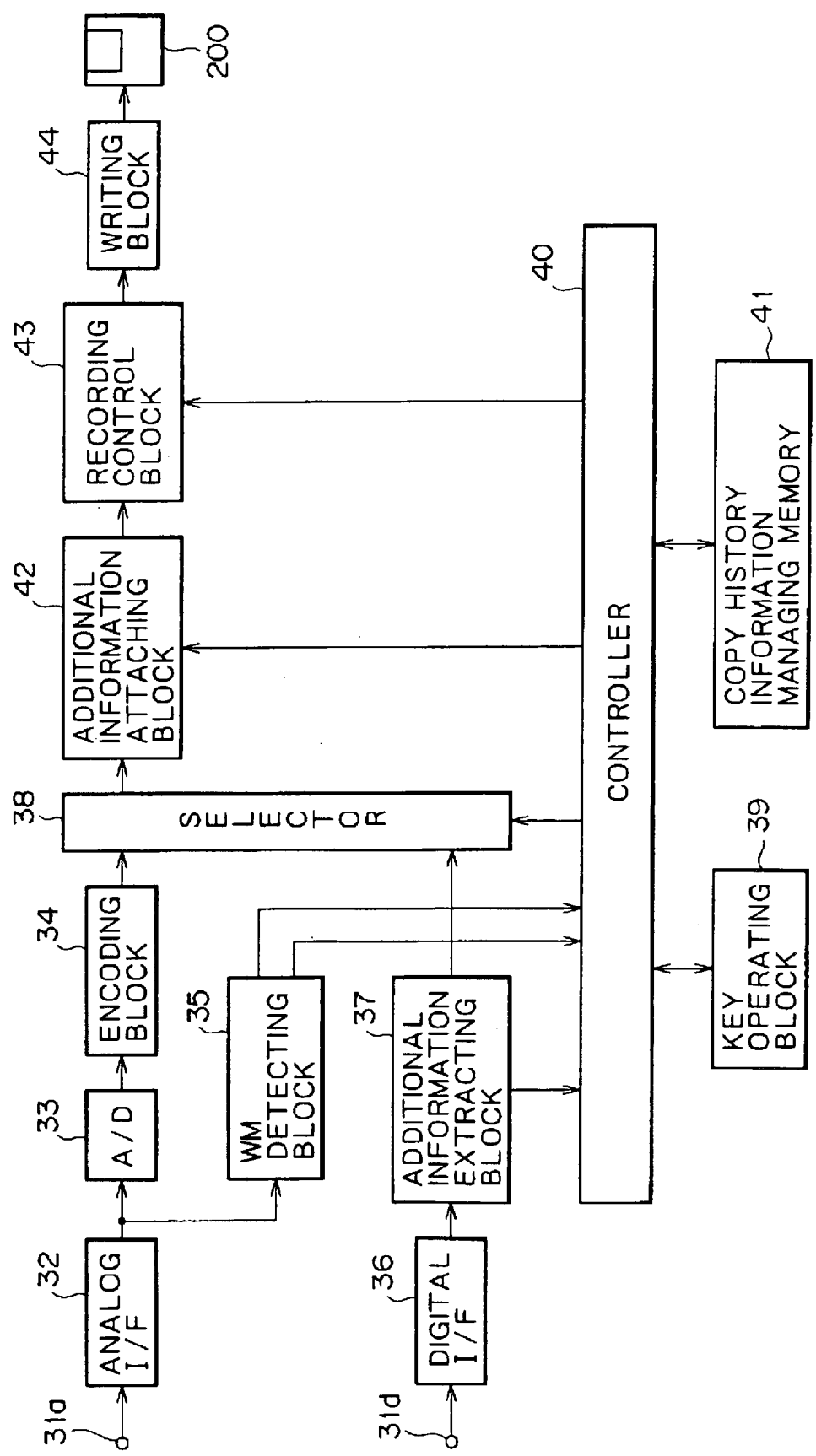
FIG. 6 is a block diagram illustrating one example of an information signal recording apparatus practiced as one preferred embodiment of the invention.

Referring to FIG. 6, there is shown a preferred embodiment of the audio signal recording apparatus that receives the signals of the information content in the form of an analog audio signal reproduced by the CD player shown in FIG. 5 and the information content in the form of a digital compressed signal and records these signals on a recording medium. This recording apparatus is the recording system of a recording/reproducing apparatus (hereafter referred to as an MD apparatus) that uses an MD (Mini Disc) for the recording medium. In FIG. 6, the reproducing system of the MD apparatus is omitted for the simplicity of description.

The MD recording apparatus comprises an analog interface and a digital interface, receives information contents in the forms of analog audio signal and a digital audio signal, and executes copy control on the basis of the copy count for that information content in the MD recording apparatus. If copy is permitted, the MD recording apparatus duplicates the information content on an MD 200, confirms the completion of copying, and decrements the copy permitted count by one in the MD recording apparatus.

For this copy count control, the MD recording apparatus has a copy history information managing memory 41. This memory stores, as copy history information, a table TB listing the correlation between content ID and copy permitted count of the information content identified by that ID in this MD recording apparatus as shown in FIG. 7.

If the MD recording apparatus determines that certain information content is first one that has been entered in the MD recording apparatus, the content ID and copy permitted count in the copy control information attached to that information content are entered in the copy history information table TB as the history information about that information content. Then, the MD recording apparatus duplicates the inputted information content and, upon confirmation of the completion of copying, decrements the copy permitted count by one for the copied information content.

When that information content is inputted in the MD recording apparatus again, the content ID attached to that information content and the copy permitted count in the copy control information are not entered in the table TB because that information content is already stored in the table TB. Then, from the copy permitted count for the information content indicated by the content ID in the table TB, the MD recording apparatus determines whether that information content can be copied in the MD recording apparatus. If the information content is found duplicatable, the MD recording apparatus decrements the copy permitted count in the table TB by one upon completion of copying.

Thus, the MD recording apparatus controls the copy permitted count for each piece of information content as limited. It should be noted that, in this embodiment, copy generation control is also executed on the basis of CGMS information.

Copy Control of Information Content in the MD Recording Apparatus

Information content of music inputted through an analog input terminal 31a is supplied to an A/D converter 33 through an analog interface 32 to be converted into a digital signal. The digital signal is supplied to an encoding block 34. In the encoding block 34, predetermined data compression processing and error correction encoding processing are executed on the digital signal. The resultant digital signal is supplied to a selector 38.

The analog audio signal from the analog interface 32 is supplied to an electronic watermark detecting block (hereafter referred to as a WM detecting block) 35. The WM detecting block 35 despreads the analog audio signal by use of the PN code sequences PNa and PNb used in the WM forming block 3 shown in FIG. 3, detecting the content ID and the copy control information superimposed as electronic watermark information. The detected content ID and copy control information are supplied to a controller 40.

In this case, the copy control information is 8 bits wide and therefore detected comparatively more easily than the content ID. Therefore, the start and end flags can be confirmed quickly.

The controller 40 identifies the information content inputted as an analog audio signal from the input terminal 31a by the content ID supplied from the WM detecting block 35 and, on the basis of the copy control information, determines whether to duplicate the information content. If the information content is to be copied, the control block 40 checks both the start and end flags, confirming the completion of copying. Then, the control block 40 decrements the copy permitted count for the information content in the copy history information managing memory 41 by one, updating the copy history information.

A digital audio signal coming from a digital audio signal input terminal 31d through a digital interface 36 is supplied to an additional information extracting block 37. The additional information extracting block 37 extracts the content ID and copy control information from the compressed digital data, supplying the extracted content ID and copy control information to the selector 38.

The control block 40 identifies the information content inputted as a compressed digital audio signal from the input terminal 31d by use of the content ID supplied from the additional information extracting block 35 and, on the basis of the copy control information, determines whether to duplicate the information content. If the information content is to be copied, the controller 40 checks both the start and end flags, confirming the completion of copying. Then, the controller 40 decrements the copy permitted count for the information content in the copy history information managing memory 41 by one, updating the copy history information.

On the basis of a selector control signal corresponding to the input made by the user from a key operating block 39, the selector 38 selects one of the data supplied from the encoding block 34 and the data supplied from the digital interface block 36 and outputs the selected data to a recording control block 43 through the additional information attaching block 42.

The copy control information to be attached to the copied digital audio data is supplied along with the content ID from the controller 40 to the additional information attaching block 42. For example, if the CGMS information attached to the inputted information content is "10" denoting the permission of copy once and the inputted information content is to be copied, the CGMS information is changed to "11" denoting the prohibition of copy and the changed CGMS information is supplied from the controller 40 to the additional information attaching block 42 as the copy control information.

When the information content is to be performed, the recording control block 43, under the control of the controller 40, records the digital data on the MD 200; if copying is prohibited, the recording control block 43 stops supplying the digital data to the writing block 44, disabling the recording.

As described and will be described, the controller 40 references the CGMS information attached to the information content or the copy history information to determine whether to duplicate the information content for recording. The controller 40 sends a control signal indicative of the decision to the recording control block 43 to make the same execute the above-mentioned recording control operation.

For example, if the copy history information in the copy history information managing memory 41 for the information content to be copied indicates copy permitted count=0, the controller 40 determines that the information content has been copied the permitted number of times and therefore controls the recording control block 42 not to duplicate the information content.

If the copy history information in the copy history information managing memory 41 for the information content to be duplicated indicates copy permitted count=1 or more, the controller 40 permits copying the information content. When copying has been completed, the controller 40 decrements the copy permitted count of the copy history information by one, updating the copy permitted count of the copy history information stored in the copy history information managing memory 41.

Figure 8:
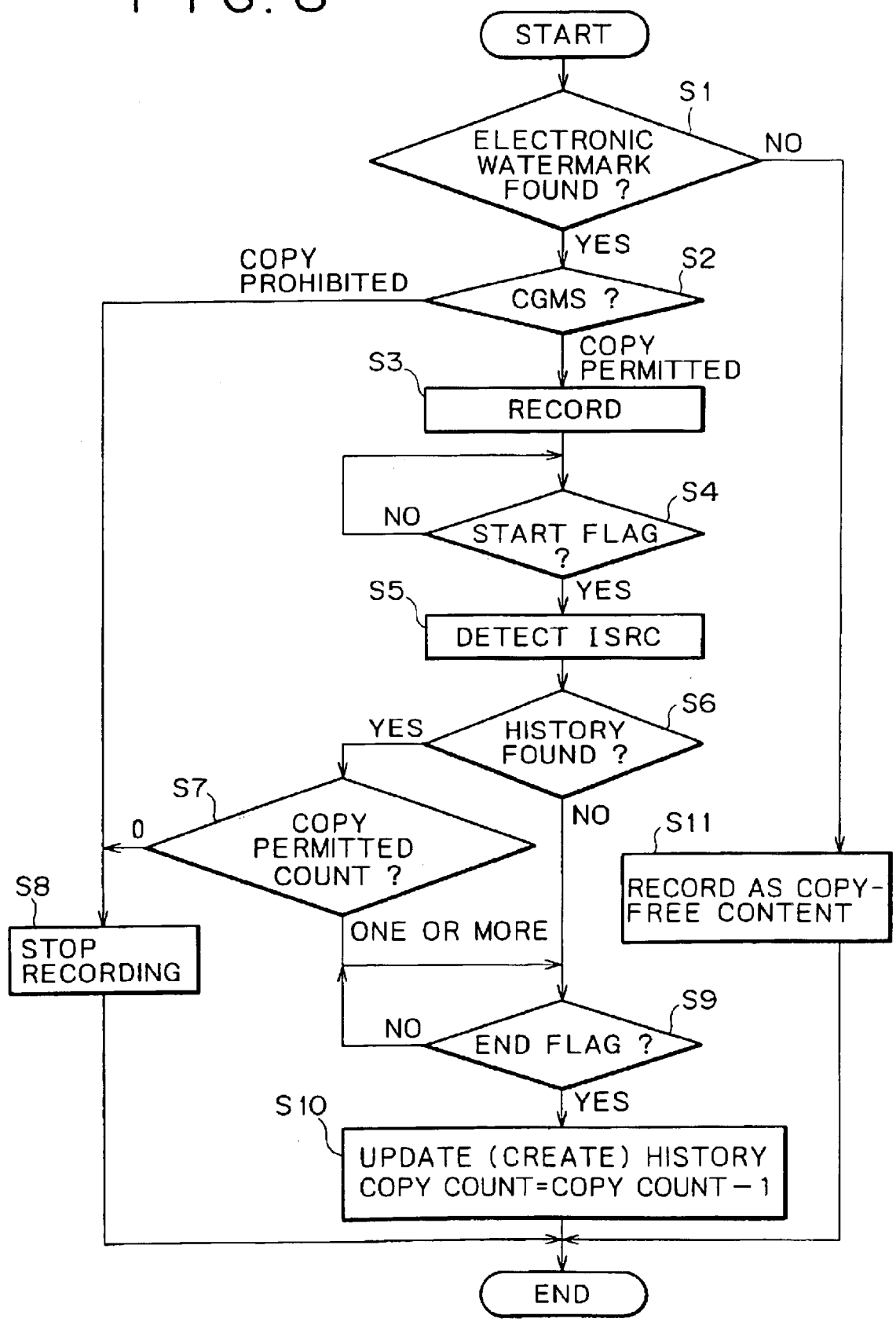
FIG. 8 is a flowchart for describing copy control processing in the embodiment of the information signal recording apparatus.

The following further describes the copy control processing on the analog audio signal input in the MD recording apparatus shown in FIG. 6 with reference to the flowchart shown in FIG. 8. The processing shown in FIG. 6 is mainly executed by the controller 40.

First, the controller 40 determines whether the electronic watermark information of content ID and the electronic watermark information of copy control information are superimposed on the information content in the state of an analog audio signal (step S1). If the electronic watermark information is found not superimposed, the controller 40 determines that this information content is copy-free content and executes copying and recording (step S11).

If the electronic watermark information is found superimposed on the information content, the controller 40 references the CGMS information in the electronic watermark information detected in the WM detecting block 35 (step S2). If this CGMS information is found "11" indicating that copying is prohibited, the controller 40 controls the recording control block 43 to disable the recording (step S8).

If the CGMS information is "00" or "10" indicating that copying is permitted, the controller 40 starts a recording operation (step S3). Then, the controller 40 detects the start flag included in the electronic watermark information of the information content, thereby detecting the beginning of the information content (step S4). At the detection of the start flag, the controller 40 starts a preparing operation for storing the copy history in the copy history information managing memory 41.

Then, the controller 40 detects and analyzes ISRC to identify the information content (step S5). When the ISRC of the information content is detected, the controller 40 searches the copy history information managing memory 41 on the basis of this ISRC to determine whether the copy history of this information content is stored in the table TB in the memory 41 (step S6).

If the past history is found in the table TB, the controller 40 checks the copy permitted count for this information content (step S7). If the copy permitted count is 0, the controller 40 stops recording (step S8). If the copy permitted count is 1 or more, the controller 40 continues recording and determines whether the end flag of the copy control information added to the information content is set up or not (step S9). Then, the controller 40 detects the end of the information content with the end flag set up. When copying ends by the key operation by the user, the controller 40 decrements the copy permitted count of the copied information content by one, updating the copy history information (step S10).

If the last history is not found in the table TB in step S6, the controller 40 sets the content ID namely ISRC in the copy control information attached to the information content and the copy permitted count to the table TB as a preparatory operation for storing the copy history in the copy history information managing memory 41 as information content entered in the recording apparatus for the first time. The controller 40 then detects the end of the information content with the end flag set up (step S9). When copying ends by the key operation by the user, the controller 40 decrements the copy permitted count of the copied information content by one and rewrites the copy permitted count accordingly in the table TB in the copy history information managing memory 41 (step S10).

As seen from the flowchart shown in FIG. 8, if the recording is stopped by the user before the detection of the end flag or the recording apparatus stops because the disc 200 is full, the controller 40 determines copy is incomplete, not updating the table TB in the copy history information managing memory 41. Consequently, the incomplete copy of the recording information can be made invalid.

If the information content is in the state of an analog signal, the start and end flags are embedded as electronic watermark information, so that the controller 40 can correctly detect the start and end of the copyrighted portion of the information content.

If an attempt for unauthorized copy makes tampering that one or both of the start and end flags is removed from the information content in order that the completion of copy is not detected, the tampering is very difficult to practice because the start and end flags are embedded in the same time domain and frequency area as the information content as the electronic watermark information. Thus, copy control management can be executed in the assured manner.

For the detection of the beginning and end of information content, it is possible to embed information indicative of elapsed time such as a time code as the electronic watermark information in the information content. However, this raises the data rate of the additional information, making it difficult to embed the time code without affecting the information content. If the time code can be embedded anyhow, its detection becomes difficult.

On the contrary, the scheme of the above-mentioned embodiment in which the start and end flags are embedded as electronic watermark information requires less data quantity, is easy in embedding the start and end flags as electronic watermark information, and can detect them quickly.

It is also possible, for the detection of the beginning and end of information content, to embed electronic watermark information in the soundless interval between pieces of information content (for example, between pieces of music) or in the black screen between scenes. However, the electronic watermark information embedded in the no-signal portion is prone to be detected as noise and easy to be removed by an attempt for unauthorized copy.

With the above-mentioned embodiment, the start and end flags are embedded in the information content portion as electronic watermark information, the above-mentioned problems are circumvented.

In the above-mentioned example, the electronic watermark information of content ID and the electronic watermark information of copy control information are superimposed on the analog information content. Alternatively, the electronic watermark information may be superimposed on the baseband digital signal before being compressed, which is the output of the A/D converter 6. In this case, even after the conversion of the digital information content into an analog signal, the electronic watermark information of copy control information can still be detected from this analog information content.

It is also practicable to change the length of the copy control information to 6 bits, separating the 2 bits of the start and end flags. In this case, the 2-bit information is spectrum-spread by PN code PNc of another PN code series to be superimposed on the audio signal, thereby making it easier to detect the start and end flags. Namely, in this case, the 2 bits of the start and end flags may only be superimposed on the portion indicated by "START" and "END" shown in FIG. 4 and only the start flag bit is set to "1" in the "START" portion and only the end flag bit is set to "1" in the "END" portion.

In the above-mentioned example, the electronic watermark information is not embedded in the compressed digital data because ISRC information and copy control information are added in separate time domains. It is also practicable to embed the electronic watermark information of content ID and copy control information into the compressed digital data. For example, in the case of compression by means of DCT (Discrete Cosine Transform), the electronic watermark information may be embedded in a particular DCT factor, for example, a DC factor.

This arrangement allows, also in the case of compressed digital data, the detection of the completion of copy by detecting the start and end positions of information content by use of electronic watermark information.

In the above-mentioned embodiment, for content ID and copy control information, PN codes of different series are used. It will be apparent that, for the PN codes of different series, portions having different phases generated by the PN code generating block of the same PN series may be used.

Figure 9:
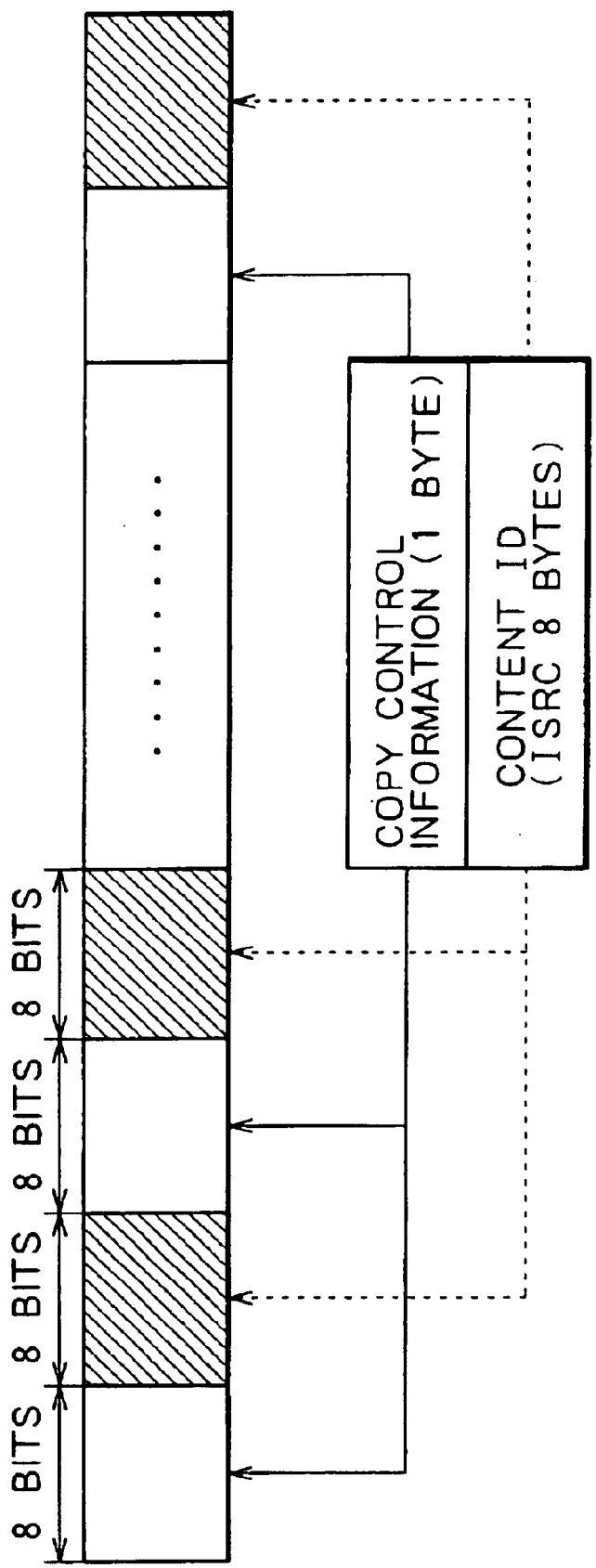
FIG. 9 is a diagram illustrating another example of the electronic watermark information superimposing method according to the invention.

It is also practicable, as shown in FIG. 9, to alternate 8-bit copy control information and 8-bit content ID, which are spectrum-spread by one PN code to be superimposed on the information content.

Figure 10:
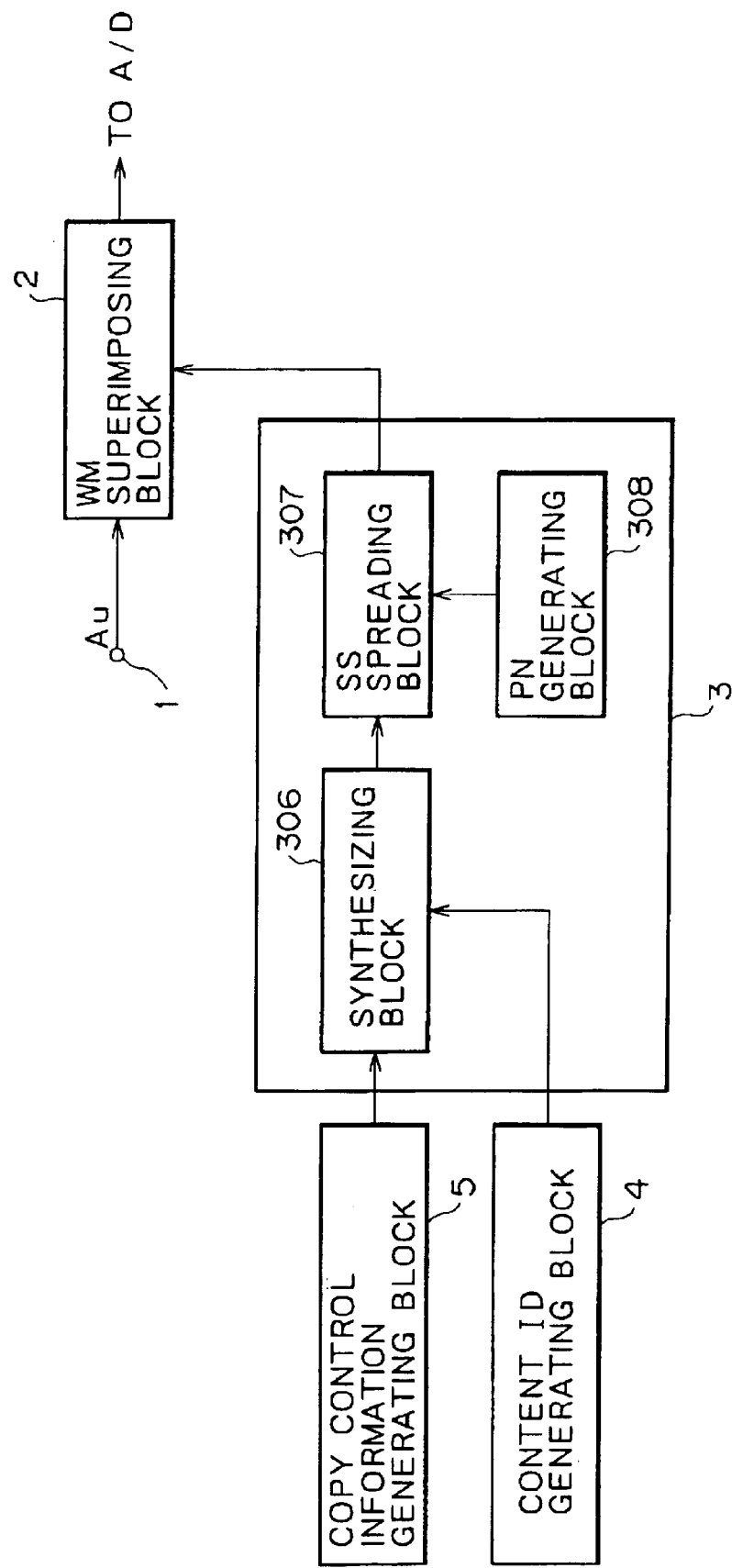
FIG. 10 is a block diagram illustrating the electronic watermark superimposing method shown in FIG. 9.

Referring to FIG. 10, there is shown an exemplary configuration of the WM forming block 3 to implement the arrangement shown in FIG. 9. As shown, a content ID from the content ID generating block 4 and copy control information from the copy control information generating block 5 are supplied to a synthesizing block 306 to be combined in alternation of 8-bit basis as shown in FIG. 9.

The content ID and the copy control information combined in the synthesizing block 306 are supplied to a spreading block 307 to be multiplied by a PN code series supplied from a PN generating block 308 for spectrum-spreading. Then, a resultant spread-spectrum signal supplied from the spreading block 307 is supplied to the WM superimposing block 2 to be superimposed on the information content.

In the above-mentioned example, use of a single PN code series alone can superimpose content ID and copy control information including start and end flags onto information content as electronic watermark information and detect it from this information content.

Another Embodiment of the Method of Detecting Start and End of Information Content In the above-mentioned embodiments, the start and end flags are superimposed on information content as electronic watermark information and the beginning and end of the information content are detected by detecting these start and end flags, detecting the completion of copying. However, the completion of copy may be recognized without superimposing the start and end flags. Namely, the completion of copy may be detected by detecting the content IDs repeatedly superimposed as electronic watermark information from the beginning to the end of information content as shown in FIG. 4 and then detecting the change points of these content IDs.

To be more specific, a content ID is unique to each piece of information content and therefore different pieces of information content have different content IDs. Therefore, detection of the difference between content IDs can detect the start and end points of time of each piece of information content, namely the separation between pieces of information content.

Referring to FIG. 11, there is shown a flowchart for describing the copy control processing in the above-mentioned case. This flowchart differs from the flowchart shown in FIG. 8 in the method of detecting the start and end points of time of information content.

Namely, in the example shown in FIG. 11, when, after start of a copy recording operation in step S3 like the example shown in FIG. 8, ISRC, which is the content ID superimposed as electronic watermark information, is detected from the soundless portion (step S21), the controller 40 determines the beginning of that information content (step S22). Then, the controller 40 uses the detected ISRC to search the copy history information managing memory 41 to determine whether the past history of that information content is stored in the table TB in the memory 41 (step S23).

If the past history is found in the table TB, the controller 40 checks the copy permitted count for that information content (step S24). If the count is 0, the controller 40 stops the recording operation (step S8). If the count is 1 or more, the controller continues the recording operation and further detects the ISRC of the content ID attached to the information content to determine whether the ISRC has changed (step S25). Then, when a change of the ISRC has been detected, the controller 40 determines the completion of copying. When copying is ended by the key operation by the user, the controller 40 decrements the copy permitted count of the copied information content by one in the table TB in the copy history information managing memory 41, updating the copy history information (step S10).

If the past history is not found in the table TB in step S6, the controller 40 sets the content ID namely ISRC in the copy control information attached to that information content and the copy permitted count to the table TB as a preparatory operation for storing a record in the copy history information managing memory 41 as the information content entered in the recording apparatus for the first time.

Then, the controller 40 continues the recording operation to further detect the ISRC of the content ID attached to the information content. When a change of the ISRC has been detected, the controller 40 determines the completion of copying. When copying is ended by the key operation by the user, the controller 40 decrements the copy permitted count for the copied information content by one in the table TB in the copy history information managing memory 41, updating the copy history information (step S10).

In the present embodiment, effective use of the content ID superimposed on information content as electronic watermark information can detect the completion of copying of the information content.

It should be noted that, in the above description, the start point of time of information content is detected as the point of time at which ISRC has been detected from the soundless portion. However, this applies only to the first piece of information content. When copying two or more pieces of information content consecutively, an ISRC change point is detected as the end point of the preceding information content and the start point of the current information content.

In the above-mentioned two embodiments, CGMS information as copy generation control information is recorded along with copy control information. Only managing copy permitted count can perform copy control, so that CGMS information need not be superimposed.

In the above-mentioned embodiments, copy permitted count information is included in copy control information. If the copy permitted count in the recording apparatus uses a method in which a predetermined certain count provides a limit, the content ID of the information content entered for the first time and the predetermined limit (maximum) of the copy permitted count are set to the table TB, thereby initializing the copy history. Therefore, the copy permitted count information may not be included in the copy control information to be superimposed on the information content.

In the case of digital information, CGMS information may be attached not as electronic watermark information. This holds with the copy permitted count information.

In the case of information content in the form of an analog signal, the entire copy control information must be superimposed as electronic watermark information. In the case of a digital compressed signal, the copy control information may be attached to an area separate from the data area. In this case, however, the start and end flags are superimposed as electronic watermark information for an analog signal or a baseband digital signal.

The information content to which the present invention is applied is not only audio information content but also video information content for example.

In the above-mentioned embodiments, the start and end flags are used for the detection of the completion of copying when controlling copying of information content provided in a recording medium. The present invention is also applicable to examples in which information content is provided as broadcast signals or through the Internet.

After the completion of copy, the copy history of the recording apparatus is updated as post-processing in the above-mentioned embodiments. This invention is also applicable to an example in which billing is executed as post-processing after the information content provided through the Internet has all been downloaded and stored in the memory (namely duplicated).

It will be apparent that the electronic watermark processing is not limited to the above-mentioned spread spectrum processing.

As described and according to the invention, the completion of copying can be surely detected for each piece of information content. Consequently, if copy fails due to an operation error made by user for example, the failed copy can be invalidated for user advantage.

The information for detecting the start and end of information content is superimposed thereon as electronic watermark information. Consequently, it is difficult to tamper this start and end of the information for detecting information for unauthorized copy of the information content. Therefore, the present invention provides reliable copy control management.

While the preferred embodiments of the present invention have been described using specific terms, such description is for illustrative purposes only, and it is to be understood that changes and variations may be made without departing from the spirit or scope of the appended claims.

What is claimed is:

1. An information signal copy managing method comprising the steps of:

attaching identification information for identifying each piece of information content to the same and superimposing information indicative of a start of and information indicative of an end of a portion of said each piece of information content, said portion being covered by copyright, onto said each piece of information content to transmit a resultant information signal; and identifying said each piece of information content to be copied and recorded by said identification information for each recording apparatus and, when both of said information indicative of the start of and said information indicative of the end of said copyrighted portion are detected from said electronic watermark information, updating copy permitted count for said each piece of information content, wherein said recording apparatus manages copy count managing information by storing the same in a memory thereof as copy history information, said copy count managing information being for managing a copy permitted count of said each piece of information content identified by said identification information; and when copying said each piece of information content, references said copy history information about said each piece of information content to be copied to control copying and, when both of said information indicative of the start of and said information indicative of the end of said copyrighted portion are determined from said electronic watermark information, updates said copy history information about said each piece of information content, and wherein said information signal is further attached with information about copy permitted count of said each piece of information content;

when recording said each piece of information content for the first time by said recording apparatus, said copy permitted count extracted from said information signal is related with said identification information of said each piece of information content to be stored in said memory of said recording apparatus as said copy history information; and when both of said information indicative of the start of and said information indicative of the end of said copyrighted portion are determined from said electronic watermark information, said copy permitted count in said memory is decremented by one for the copied and recorded each piece of information content.

2. The information signal copy managing method according to claim 1, wherein the information about said copy permitted count is also superimposed on said each piece of information content of said information signal as electronic watermark information.

3. An information signal recording apparatus for copying and recording an information signal in which identification information for identifying each piece of information content is attached to the same and information indicative of a start of and information indicative of an end of a portion of said each piece of information content, said portion being covered by copyright, are superimposed on said each piece of information content as electronic watermark information, said information signal recording apparatus comprising:

an identification information detecting means for detecting said identification information from said each piece of information content to be copied and recorded;

a memory for storing and managing, as copy history information, copy count managing information for managing copy permitted count for said each piece of information content identified by said identification information detected by said identification information detecting means;

a copy control means for executing copying and recording control on the basis of said copy history information stored in said memory about said each piece of information content identified by said identification information detected by said identification information detecting means when copying and recording said each piece of information content;

an electronic watermark information detecting means for detecting said electronic watermark information from said each piece of information content to be copied and recorded; and a copy history updating means for updating said copy history information about said each piece of information content when both of said information indicative of the start of and said information indicative of the end of said copyrighted portion are detected by said electronic watermark information detecting means if copying and recording are executed by said copy control means, wherein said information signal is further attached with copy control information for said each piece of information content as electronic watermark information; and said copy control means also executes copy control on said each piece of information content on the basis of said copy control information detected from said information signal at copying and recording said each piece of information content, and wherein said information signal is further attached with information about copy permitted count for said each of information content as electronic watermark information;

said information signal recording apparatus further comprising a means for recording, in said memory, said copy permitted count extracted from said information signal, in relation to said identification information for said each piece of information content, as said copy history information at recording of said each piece of information content for the first time; and said copy history updating means decrements said copy permitted count in said memory by one for the copied and recorded each piece of information content when both of said information indicative of the start of and said information indicative of the end of said copyrighted portion are determined from said electronic watermark information.

4. An information signal copy managing method comprising the steps of:

superimposing identification information for each piece of information content as electronic watermark information onto at least an entire section of said each piece of information content, said entire section being covered by copyright and transmitting a resultant information signal;

identifying, by said identification information, for each recording apparatus, said each piece of information content to be copied and recorded and, at the same time, detecting a change point in said identification information as a copy start position and a copy end position of said each piece of information content; and when both of said copy start position and said copy end position are detected, updating a copy permitted count for said each piece of information content, wherein said recording apparatus stores for management, in a memory of said recording apparatus, as copy history information, copy count managing information for managing said copy permitted count for said each piece of information content identified by said identification information; and when copying said each piece of information content, referencing said copy history information about said each piece of information content to be copied to control copying and, when both of said copy start position and said copy end position are detected, updating said copy history information about said each piece of information content, and wherein said information signal is further attached with information about said copy permitted count for said each piece of information content;

when said information content is recorded by said recording apparatus for the first time, said copy permitted count extracted from said information signal is recorded, as said copy history information, in said memory of said recording apparatus in relation with said identification information of said information content; and when both of said copy start position and said copy end position are detected, said copy permitted count in said memory is decremented by one for the copied and recorded information content.

5. The information signal copy managing method according to claim 4, wherein the information about said copy permitted count is also superimposed on each piece of said information content of said information signal as electronic watermark information.

* * * * *